Nov. 29, 1966   D. L. KLASS ETAL   3,289,017
SHEAR RESPONSIVE LIQUID GENERATOR
Filed Dec. 23, 1963
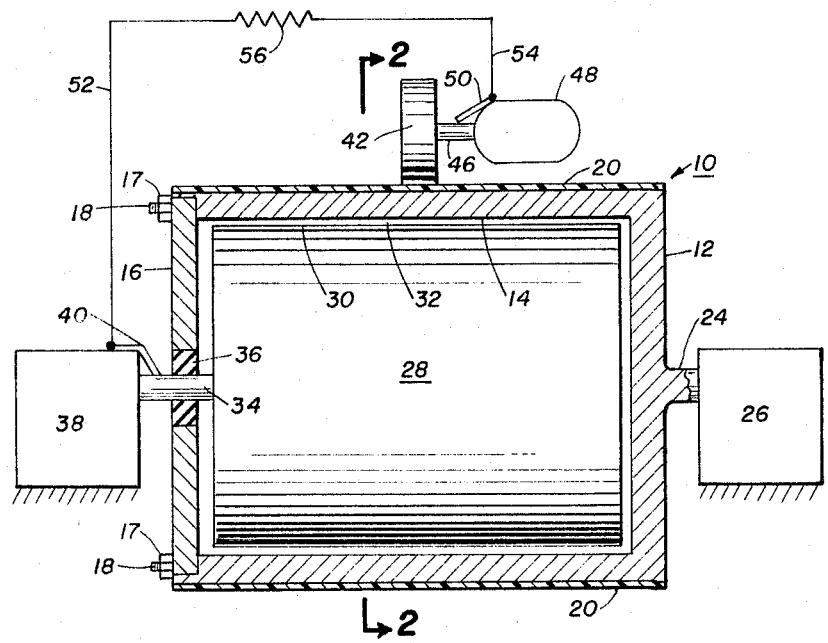
FIG. 1
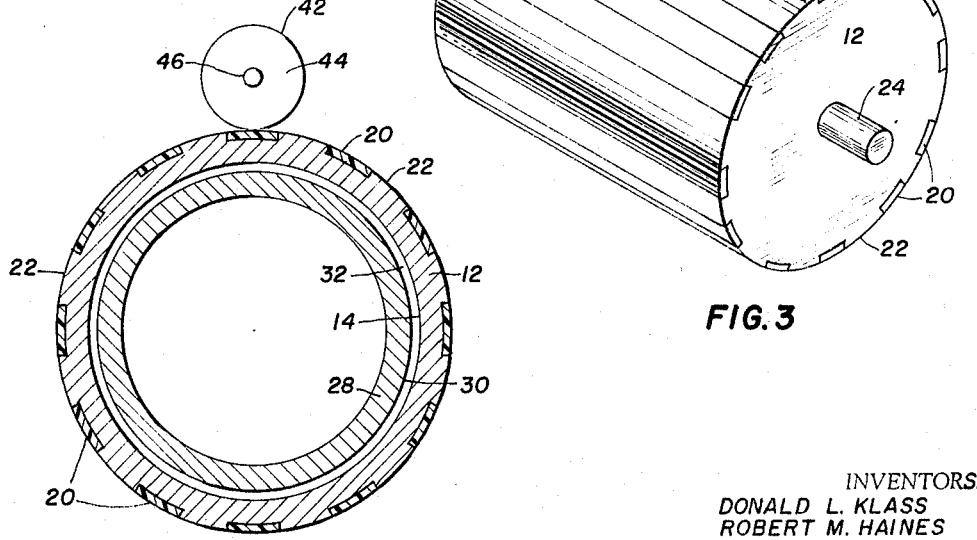
FIG. 2
FIG. 3
INVENTORS.
DONALD L. KLASS
ROBERT M. HAINES
BY ROBERT B. McEUEN
THOMAS W. MARTINEK
ATTORNEY.

United States Patent Office 3,289,017
Patented Nov. 29, 1966

3,289,017
SHEAR RESPONSIVE LIQUID GENERATOR
Donald L. Klass, Barrington, Robert M. Haines, Crystal Lake, Robert B. McEuen, Barrington, and Thomas W. Martinek, Crystal Lake, Ill., assignors, by mesne assignments, to Union Oil Company of California, Los Angeles, Calif., a corporation of California
Filed Dec. 23, 1963, Ser. No. 332,483
17 Claims. (Cl. 310—2)

This invention relates to the generation of electrical energy and, more particularly, to an apparatus and method for generating a pulsating direct current.

A number of electrical phenomena are exhibited when suspensions of certain solids in oils are subjected to shear stresses. When a suspension of poorly conducting particles in an oleaginous vehicle of relatively low dielectric constant, such as a dispersion of silica in a mineral oil, is subjected to shear stress as between opposing electrically conductive surfaces of two bodies moving with respect to each other, the suspension exhibits changes in electrical properties, such as a decrease in D.C. resistance, a change in dielectric constant, and the generation of an induced potential. The magnitude of each of these phenomena depends on the shear rate, the temperature, the spacing between the opposing surfaces, and also the composition. The magnitude of the induced potential depends also on the compositions of the opposing surfaces. For the purpose of this application, such suspensions are hereinafter designated "shear-responsive" or "electrodynamic" liquids or fluids.

This invention is based on a novel apparatus and method utilizing a shear-responsive liquid under shear to generate a pulsating direct current. In accordance with this invention, a film of a shear-responsive fluid is sheared between opposing surfaces of two spaced bodies which are moved with respect to each other. The opposing shearing surfaces, which are electrically conductive, are intermittently electrically connected to each other through an external electrical circuit. As the two bodies are moved with respect to each other, the shearing of the shear-responsive liquid generates a direct current that flows pulsatingly as the circuit is intermittently completed.

It is therefore an object of this invention to provide an apparatus and method for converting motion to electrical energy.

Another object of this invention is to provide an apparatus and method for generating a direct current.

Still another object of this invention is to provide an apparatus and a method in which a shear-responsive liquid is subjected to shear to generate a pulsating direct current.

These and further objects of this invention will become apparent or be described as the description thereof herein proceeds and reference is made to the accompanying drawings in which:

FIGURE 1 is an elevational view, partly schematic and partly in section, of the appartus of this invention, FIGURE 2 is a sectional view in the plane 2—2 of FIGURE 1, and FIGURE 3 is a perspective view of the outer cylindrical member of the apparatus of FIGURES 1 and 2.

This invention is best described by reference to the accompanying drawings wherein the reference numeral 10 designates a drum which includes cup-shaped portion 12, having interior surface 14, and cover plate 16. Cup-shaped portion 12 is fabricated of an electrically conductive material, such as brass, copper, steel, etc. Cover plate 16 is secured to cup-shaped portion 12 by nuts 17 engaging threaded lugs 18. The outer cylindrical surface of cup-shaped portion 12 is provided around the circumference thereof with a plurality of spaced grooves in which are disposed strips 20 of an electrically insulating material, such as Bakelite, nylon, Teflon, ceramic, etc. Strips 20 are substantially the same height as the grooves and the exposed surface of each of the strips 20 is arcuate in shape so that strips 20 and exposed areas 22 of the outer cylindrical surface between strips 20 form a relatively smooth cylindrical surface. It will be thus seen that the outer cylindrical surface of drum 10 is comprised of alternate strips of electrically conductive and electrically insulating materials around the circumference thereof. Strips 20 and areas 22 are preferably individually of the same width to produce a uniform pulsating current, but strips 20 need not be the same width as areas 22. Extending axially from drum 10 is trunnion 24 by which drum 10 is rotatably supported by support means 26, which includes a support bearing for trunnion 24 and means for applying rotary motion thereto, such as an electric motor, gears, etc.

Supported axially of surface 14 within drum 10 is drum 28 having electrically conductive peripheral surface 30. The diameter of surface 30 of drum 28 is less than the diameter of surface 14 to form annular space 32 therebetween. The space between surfaces 30 and 14 is preferably about 0.003 to 0.030 inch, although other spacings may be utilized. A liquid which will generate a D.C. potential on being sheared, e.g., a shear-responsive liquid, is disposed in annular space 32. Extending axially of drum 28 is trunnion 34, which passes through non-conductive bearing 36 in cover portion 16 in fluid-tight relationship therewith. Trunnion 34 is supported by support means 38 which includes a support bearing for trunnion 34, and, if desired, means to rotate drum 28 in a direction opposite that which drum 10 is rotated, or in the same direction but at a different speed than that at which drum 10 is rotated. Trunnion 34, which is electrically conductive and electrically connected to surface 30, is contacted by brush 40.

Contacting the outer cylindrical surface of drum 10 is electrically conductive cylindrical surface 42 of rotatably supported disc 44. Disc 44 is rotatably supported by axle 46 extending from support means 48, which may include only a support bearing so that disc 44 is rotated by frictoinal engagement with the outer cylindrical surface of rotating drum 10. It will be apparent that the relative diameters of drum 10 and disc 44 and the width of strips 20 and areas 22 must be adjusted such that surface 42 will contact only one of strips 20 or areas 22 at one time. If desired, support means 48 may includes an electric motor to rotate disc 44 in either direction independently of the rotation of drum 10. Contacting axle 46, which is electrically conductive and in electrical contact with surface 42, is brush 50. Brushes 40 and 50 are connected by lead wires 52 and 54, respectively, to external circuit 56, which includes means actuated by a pulsating direct current.

In operation, when drums 10 and 28 are rotated with respect to each other, as by drum 10 being rotated while drum 28 is held stationary, the shear-responsive liquid in annular space 32 is subjected to shear, thereby resulting in a continuous D.C. potential being applied between surfaces 14 and 30. Although lead wire 52 is continuously electrically connected through brush 40 and trunnion 34 to surface 30, lead wire 54 is only intermittently electrically connected with surface 14 since disc 44, in frictional engagement with the outer surface of drum 10, contacts strips 20 between conductive areas 22. This intermittent electrical connection between surfaces 42 and 14 results in a pulsating D.C. current being applied to external circuit 56.

Although this invention has been described in relation to a specific embodiment, it will be apparent that obvious modifications may be made by one skilled in the art without departing from the intended scope of this invention. For example, opposing surfaces 14 and 30 between which the shear-responsive liquid is sheared may be fabricated of the same metal or different metals. It is preferred that surfaces 14 and 30 be fabricated of dissimilar metals since a greater D.C. potential will then be generated. Although drum 10 is illustrated as being a hollow metal drum, it is only essential that internal surface 14 and exposed areas 22 of drum 10 be electrically conductive and electrically connected to each other, as hereinbefore described. Drum 28 may be hollow or solid and it need only have an electrically conductive peripheral surface in electrical contact with trunnion 34. Drums 10 and 28 may be rotated with respect to each other by being rotated in the same direction at different speeds, in opposite directions, or one may be held stationary while the other is rotated. If drum 10 is held stationary while drum 28 is rotated it will be obvious that support means 48 must include means, such as an electric motor, to rotate disc 44 and the strips 20 must then be included in surface 42 rather than in the outer surface of drum 10. While strips 20 are illustrated as extending the entire length of drum 10, it is only necessary that they be located in the portion of the outer cylindrical surface of drum 10 which is contacted by disc 44. It will also be obvious that disc 44 and associated support means can be replaced by a simple brush, such as brush 40. The characteristics of the generated pulsating direct current can be regulated by various means, such as varying the relative speeds of drums 10 and 28, the relative speeds of drum 10 and disc 44, the sizes of strips 20 and exposed areas 22, or combinations thereof. While it is preferred that the shear-responsive liquid be sheared between two cylindrical surfaces rotating with respect to each other to simplify the apparatus, it will be evident that devices of other designs may be used, such as one where the shear-responsive liquid is sheared between two flat surfaces of spaced bodies which are reciprocally moved with respect to each other.

The shear-responsive compositions utilized in the apparatus and method of this invention form no part of the invention, and, for the purpose of this specification and claims, the term "liquid" is intended to include liquids in the ordinary sense of the term, i.e., readily flowing compositions, and compositions of relatively high viscosity, i.e., those having a grease-like consistency at room temperature. In general, the shear-responsive compositions will consist of at least about 1% by volume and preferably 5 to 48% by volume of particulate poorly-conducting materials dispersed in a non-polar oleaginous vehicle, which has a dielectric constant less than about 5. The poorly-conducting particles, which may be either of piezoelectric or non-piezoelectric materials, have an average size in the range of about 0.001 to 5.0 microns diameter, preferably about 0.01 to 1.00 micron diameter. Finely divided silica (a non-piezoelectric material) is especially suitable for use in shear-responsive liquids. Examples of other poorly-conducting particles which may be used include aluminum octoate, aluminum oleate, aluminum stearate, barium titanate, calcium stearate, activated charcoal, crystalline D-sorbitol, lead oxide, lithium stearate, magnesium silicate, micronized mica, white bentonite, and zinc stearate, vanadium pentoxide, basic aluminum acetate, etc.

The oleaginous vehicle in which the poorly-conducting particles are dispersed is preferably a refined mineral oil fraction having a viscosity within the range of about 50 to 300 SUS at 100° F., and an initial boiling point greater than about 500° F. However, a wide variety of non-polar oleaginous materials can be employed. Examples of suitable materials include white oils, lubricating oil stocks such as 80 VI neutral oil, transformer oils, synthetic oils resulting from polymerization of unsaturated hydrocarbons, alpha methyl benzyl ether, benzene, bromocyclohexane, chlorinated paraffin, dibenzyl ether, dichloroethyl ether, chlorinated or fluorinated hydrocarbons in the lubricating-oil viscosity range, N-butyl ether, silicate ester, toluene, etc.

Where large volumes of the non-conducting particles in the high concentrations are incorporated in the shear-responsive liquid, it is usually necessary to add a material to fluidize the mixture and keep the viscosity of the shear-responsive liquid at a reasonable level. For this purpose, varying amounts of a neutral surfactant can be incorporated to maintain the mixture of solid and vehicle as a fluid. Suitable neutral surfactants which may be used are selected from the polyoxyalkylene ethers, hydroxyethers, polyhydroxy-ethers and esters, as well as neutral sulfonates and other neutral surfactants.

Other neutral polar organic materials such as $C_6$–$C_{30}$ mono- or polyhydric alcohols are suitable fluidizers. Suitable neutral fluidizers include glycerol monooleate, sorbitan sesquioleate, glycol monooleate, alkyl aryl polyether alcohols, sodium dialkylsulfosuccinate, hexyl ether alcohol, butyl Cellosolve, octyl alcohol and dodecyl alcohol. The neutral fluidizer may be added in quantities sufficient to fluidize the mixture of vehicle and particles but usually not more than is necessary to obtain sufficient fluidity is used. The amount added will seldom exceed about 25% by volume.

A variety of polar materials, including water, may also be used to alter the properties of the shear-responsive liquid. Lower hydroxy-substituted hydrocarbons have been found to be highly efficient. Especially preferred are the aliphatic polyhydroxy-substituted hydrocarbons such as ethylene glycol. In general, such material in the range of about 0 to 10% by volume may be added to the shear-responsive liquid.

The following readily flowing, shear-responsive liquid is set forth only as an example of one suitable fluid which may be utilized.

| | Wt. percent |
|---|---|
| Silica | 48.48 |
| Water (adsorbed on the silica) | 6.18 |
| Glycerol monooleate | 17.75 |
| 80 VI neutral oil | 27.59 |

The embodiments of this invention in which an exclusive property or privilege is claimed are defined as follows:

1. An apparatus for generating pulsating direct current comprising
  (a) first and second spaced members mounted for movement with respect to each other and having opposing electrically conductive surfaces substantially uniformly spaced from each other,
  (b) means for confining a shear-responsive liquid in the space between said members,
  (c) means for moving said members with respect to each other, and
  (d) means for intermittently connecting said electrically conductive surfaces across an external circuit.

2. An apparatus in accordance with claim 1 which includes
  (a) a third member having a contacting surface in contact with a second surface of said first member,
  (b) at least a portion of said second surface being electrically conductive and in electrically conductive relationship with the surface of said first member opposed to the electrically conductive surface of said second member,
  (c) at least a portion of said contacting surface being electrically conductive,
  (d) means for moving at least one of said first and third members so that said second and contacting surfaces are moved with each other, and
  (e) means for breaking electrical contact between the electrically conductive portions of said second and contacting surfaces as at least one of said first and third members is moved.

3. An apparatus in accordance with claim 2 in which said second surface is parallel to the direction of relative movement of said first and second members.

4. An apparatus in accordance with claim 3 in which at least one of said second and contacting surfaces is cylindrical.

5. An apparatus in accordance with claim 4 in which one of said second and contacting surfaces is a cylindrical surface including a plurality of electrically insulating strips disposed side by side in spaced relationship around the circumference thereof, each of said strips having a bare exposed surface, being disposed such that said bare surfaces from a portion of said cylindrical surface.

6. An apparatus in accordance with claim 5 in which said first member is a hollow cylinder and said second member is a cylindrical body disposed within said hollow cylinder and having an electrically conductive external surface spaced inwardly from and concentric with said hollow cylinder to form an annular space therebetween, said liquid being confined within said annular space.

7. An apparatus in accordance with claim 6 in which said electrically insulating strips are disposed in the external cylindrical surface of said first member.

8. An apparatus in accordance with claim 7 in which said contacting surface is cylindrical.

9. An apparatus in accordance with claim 8 in which the opposing surfaces of said first and second members are spaced about 0.001 to 0.030 inch apart.

10. An apparatus for generating pulsating direct current comprising
 (a) a hollow cylinder having an electrically conductive inner surface,
 (b) a plurality of electrically insulating strips disposed side by side in spaced relationship around the circumference of said hollow cylinder,
 (c) each of said strips, having a bare exposed surface, being disposed such that said bare surfaces form a portion of the outer surface of said hollow cylinder,
 (d) the portions of the outer surface of said hollow cylinder between said strips being electrically conductive and in electrically conductive relationship with the inner surface of said hollow cylinder, whereby at least a portion of the outer surface of said hollow cylinder is formed of alternate strips of an electrically conductive material and an electrically insulating material,
 (e) a cylindrical member disposed with said hollow cylinder and having an electrically conductive outer surface spaced inwardly from and concentric with said hollow cylinder to form an annular space therebetween,
 (f) said cylindrical member and hollow cylinder being rotatably supported with respect to each other,
 (g) rotating means for rotating said cylindrical member and hollow cylinder with respect to each other,
 (h) means for confining a shear-responsive liquid within said annular space,
 (i) an electrically-conductive contacting means for sequentially contacting the alternate strips of electrically-conductive material and electrically insulating material as said cylindrical member and hollow cylinder are rotated with respect to each other,
 (j) a first electrical conductor electrically connected to the outer surface of said member, and
 (k) a second electrical conductor electrically connected to said contacting means.

11. An apparatus in accordance with claim 10 in which said electrically insulating strips are of substantially the same width.

12. An apparatus in accordance with claim 11 in which the spaces between said electrically insulating strips are of substantially the same width.

13. An apparatus in accordance with claim 12 in which said hollow cylinder is rotatably supported with respect to said cylindrical member and said rotating means is means for rotating said hollow cylinder.

14. An apparatus in accordance with claim 13 in which said contacting means is a rotatably supported cylinder having an electrically conductive outer surface adapted to engage the alternate strips of an electrically conductive material and an electrically insulating material as said hollow cylinder is rotated and said second electrical conductor is electrically connected to the outer surface of said contacting means.

15. An apparatus in accordance with claim 14 in which the outer surface of said cylindrical member is spaced about 0.003 to 0.30 inch from the inner surface of said hollow cylinder.

16. An apparatus in accordance with claim 15 in which the outer surface of said cylindrical member and the inner surface of said hollow cylinder are fabricated of dissimilar metals.

17. An apparatus in accordance with claim 16 which includes means to rotate said contacting means.

References Cited by the Examiner
UNITED STATES PATENTS

| | | | |
|---|---|---|---|
| 2,661,596 | 12/1953 | Winslow | 60—52 |
| 2,661,825 | 12/1953 | Winslow | 192—21.5 |
| 3,047,507 | 7/1962 | Winslow | 252—75 |
| 3,196,963 | 7/1965 | Klass et al. | 310—8.5 |

MILTON O. HIRSHFIELD, *Primary Examiner.*

J. D. MILLER, *Assistant Examiner.*

UNITED STATES PATENT OFFICE
CERTIFICATE OF CORRECTION

Patent No. 3,289,017 November 29, 1966

Donald L. Klass et al.

It is hereby certified that error appears in the above numbered patent requiring correction and that the said Letters Patent should read as corrected below.

Column 5, line 12, for "from" read -- form --.

Signed and sealed this 19th day of September 1967.

(SEAL)
Attest:

ERNEST W. SWIDER
Attesting Officer

EDWARD J. BRENNER
Commissioner of Patents